US012622357B2

(12) United States Patent (10) Patent No.: US 12,622,357 B2
Qin et al. (45) Date of Patent: May 12, 2026

(54) METHOD FOR CONTROLLING MOTION PARAMETERS OF PEPPER HARVESTER BASED ON COMBINATION OF POINT CLOUDS AND IMAGES

(71) Applicant: Shihezi University, Shihezi (CN)

(72) Inventors: Xinyan Qin, Shihezi (CN); Jin Lei, Shihezi (CN); Chenming Cheng, Shihezi (CN); Xinyu Zhang, Shihezi (CN); Bingpeng Wang, Shihezi (CN); Wenxing Jia, Shihezi (CN); Zhiyuan Zhai, Shihezi (CN)

( * ) Notice: Subject to any disclaimer, the term of this patent is extended or adjusted under 35 U.S.C. 154(b) by 376 days.

(21) Appl. No.: 18/523,943

(22) Filed: Nov. 30, 2023

(65) Prior Publication Data

US 2024/0415057 A1 Dec. 19, 2024

(30) Foreign Application Priority Data

Jun. 16, 2023 (CN) .......................... 202310714807.0

(51) Int. Cl.
*A01D 45/00* (2018.01)
*A01B 69/00* (2006.01)
*G01S 17/86* (2020.01)

(52) U.S. Cl.
CPC ............ *A01D 45/00* (2013.01); *A01B 69/001* (2013.01); *G01S 17/86* (2020.01)

(58) Field of Classification Search
CPC ....... A01B 69/001; A01D 45/00; G01S 17/86; G01S 17/88; G01S 17/89
See application file for complete search history.

(56) References Cited

U.S. PATENT DOCUMENTS

| | | | | |
|---|---|---|---|---|
| 10,288,737 B2 * | 5/2019 | Mooney | .................. | G01S 7/486 |
| 2007/0044445 A1 * | 3/2007 | Spicer | .................... | G01B 11/24 |
| | | | | 56/10.1 |
| 2011/0026007 A1 * | 2/2011 | Gammenthaler | ....... | G01S 17/89 |
| | | | | 356/28 |
| 2015/0015697 A1 * | 1/2015 | Redden | ................ | G06V 10/751 |
| | | | | 382/110 |

(Continued)

FOREIGN PATENT DOCUMENTS

| | | | | |
|---|---|---|---|---|
| AU | 2017377676 A9 * | 7/2019 | ............. | G01S 17/89 |
| AU | 2019466291 A1 * | 3/2022 | ........... | G06V 10/141 |

(Continued)

*Primary Examiner* — Babar Sarwar

(57) ABSTRACT

A method for controlling motion parameters of a pepper harvester based on combination of point clouds and images, including: (1) performing space-time calibration on a radar and a camera, constructing a data collection platform, and pre-processing image and point cloud data; (2) acquiring a real-time number of pepper in front of a harvester and an average height from canopies of pepper plants to soil through a point cloud, acquiring a cutting width and a pepper fruit proportion in front of the harvester through an image, and acquiring a comprehensive lowermost location of pepper fruits by combination of the point cloud and the image; (3) acquiring real-time motion parameters of the pepper harvester; and (4) controlling a real-time rotation speed, operation speed, and height of a drum using a fuzzy PID control method based on the comprehensive lowermost location of the pepper fruits and a predicted value of a feeding quantity.

10 Claims, 8 Drawing Sheets

(56) References Cited

U.S. PATENT DOCUMENTS

| | | | | |
|---|---|---|---|---|
| 2018/0092304 | A1* | 4/2018 | Moore | B25J 9/0084 |
| 2018/0114436 | A1* | 4/2018 | Felix | G08G 1/056 |
| 2019/0360552 | A1* | 11/2019 | Henry | G01S 13/88 |
| 2019/0392239 | A1* | 12/2019 | Ferrari | A01B 79/005 |
| 2020/0019777 | A1* | 1/2020 | Gurzoni, Jr. | G06V 10/803 |
| 2020/0183008 | A1* | 6/2020 | Chen | G01S 17/88 |
| 2021/0185885 | A1* | 6/2021 | Sibley | A01B 69/001 |
| 2021/0185886 | A1* | 6/2021 | Sibley | G05D 1/0274 |
| 2021/0279570 | A1* | 9/2021 | Warren | G05D 1/22 |
| 2022/0346303 | A1* | 11/2022 | Porth | G01S 17/88 |
| 2023/0255139 | A1* | 8/2023 | Sato | A01D 34/008 |
| | | | | 56/10.2 F |
| 2024/0315157 | A1* | 9/2024 | Woods | A01B 69/001 |

FOREIGN PATENT DOCUMENTS

| | | | | | | |
|---|---|---|---|---|---|---|
| CA | 3218931 | A1 | * | 11/2022 | | G01S 17/89 |
| CN | 110235600 | A | * | 9/2019 | | A01D 41/1278 |
| CN | 112702565 | A | * | 4/2021 | | H04N 23/632 |
| CN | 116106858 | A | * | 5/2023 | | G06V 20/17 |
| DE | 102021131820 | A1 | * | 6/2022 | | G06F 18/251 |
| EP | 3851872 | A1 | * | 7/2021 | | G01S 17/931 |
| EP | 4187284 | A1 | * | 5/2023 | | H04N 23/73 |
| WO | WO-2020051620 | A1 | * | 3/2020 | | B60W 60/0011 |
| WO | WO-2020126123 | A2 | * | 6/2020 | | G06T 7/55 |
| WO | WO-2023050783 | A1 | * | 4/2023 | | G06T 7/292 |
| WO | WO-2023060299 | A1 | * | 4/2023 | | G01S 7/4808 |
| WO | WO-2023106071 | A1 | * | 6/2023 | | G05D 1/617 |
| WO | WO-2023234255 | A1 | * | 12/2023 | | G05D 1/6484 |

* cited by examiner

METHOD FOR CONTROLLING MOTION PARAMETERS OF PEPPER HARVESTER BASED ON COMBINATION OF POINT CLOUDS AND IMAGES

CROSS REFERENCE TO RELATED APPLICATION

This application is based upon and claims foreign priority to Chinese Patent Application No. 202310714807.0, filed on Jun. 16, 2023, the entire content of which is incorporated herein by reference.

TECHNICAL FIELD

The present disclosure belongs to the technical field of pepper harvesters, and particularly relates to a method for controlling motion parameters of a pepper harvester based on combination of point clouds and images.

BACKGROUND

China is the country with the largest planting area of pepper in the world, and pepper is also one of the favorite vegetables for Chinese. The output value and benefit of pepper have been far higher than other vegetables, and pepper ranks first among vegetables. However, due to the particularity of the growth and mechanized harvesting of pepper, it is a great challenge to match motion parameters of a pepper harvester.

At present, the intelligence maturity of the pepper harvester is not high, and the running state of the machine is determined only by manual experience. Therefore, the operation efficiency is low, and it is difficult to realize the reasonable matching of external load and power, which is not conducive to the intelligent development of the pepper harvester. The motion parameters of the pepper harvester are closely related to the density of pepper plants, an operation width, the height of a drum, a pepper fruit proportion, and a comprehensive lowermost location of pepper fruits. Excessive density and large operation width will overload key parts of the pepper harvester, and cause a series of problems such as drum blockage, increase of pepper breakage rate, reduction of net harvest rate, and difficulty of harvester driving.

In view of the above problems, the existing technology mainly analyzes the magnitude of a force applied to a key part of the pepper harvester so as to adjust the motion parameters of the harvester, for example, analyzes the magnitude of a torque applied to a drum shaft and the magnitude of an impact force applied to spring teeth. However, this adjustment is carried out under the overload situation, which has serious lag, single control, and low intelligence, thus causing insufficient research on intelligent identification and intelligent prediction of the motion parameters of the pepper harvester. The present disclosure provides a method for controlling motion parameters of a pepper harvester based on combination of point clouds and images. The method can obtain the number of pepper plants in a to-be-harvested region in front of the pepper harvester, an average distance from canopies of the pepper plants to soil, a pepper fruit proportion, an operation width, and a comprehensive lowermost location of pepper fruits through images and point clouds. A real-time feeding quantity of a drum is predicted according to the pepper plant parameters, and real-time motion parameters of the pepper harvester are obtained in combination with a Hall sensor, a speed measurement sensor, and a drum height sensor. This method can control the operation speed of the harvester, the rotation speed of the drum, and the height of the drum in real time, thus avoiding the problem of serious lag, significantly improving the net rate of harvesting pepper and reducing the breakage rate of the pepper harvester, reducing the operation strength of an operator of the pepper harvester, and conforming to the development trend of intelligent agricultural machinery.

SUMMARY

In order to solve the above-mentioned technical problems, the present disclosure provides a method for controlling motion parameters of a pepper harvester based on combination of point clouds and images, which may predict a feeding quantity of a harvester at a next time by combination of images and point clouds, acquire the growth of pepper, and the distribution of pepper, and then control a rotation speed of a drum, an operation speed of the pepper harvester, and the height of a cutting table in real time. The method reasonably matches a power output of a hydraulic system of the harvester and an external load, thus improving the real-time performance, increasing the net harvest rate of pepper, reducing the damage rate of pepper and the failure rate, realizing automatic control, and greatly improving the intelligence level.

The present disclosure is implemented by the following technical solutions.

The present disclosure provides a method for controlling motion parameters of a pepper harvester based on combination of point clouds and images.

The method for controlling motion parameters of a pepper harvester based on combination of point clouds and images includes the following steps:

S1: acquiring laser point cloud data and image data of pepper plants in a to-be-harvested region from a lidar and a camera fixedly mounted on a cab top of a harvester;

S2: implementing time synchronization between the camera and the lidar using a multi-source sensor time synchronization method based on frequency self-matching and then implementing space synchronization using a combined calibration method on the basis of the time synchronization so as to synchronize the point cloud data and the image data in both time and space thereafter, performing pre-processing operations such as denoising and enhancing on the point cloud data and the image data collected by the camera, reducing the area of a non-operation region, reducing noise, increasing the running speed of a system, performing coordinate system transformation on the point cloud data collected by the lidar so as to obtain the same region of interest (ROI) of the processed point cloud data and image data, and finally obtaining a conversion relationship between an image pixel coordinate system and a lidar coordinate system, a conversion relationship between the lidar coordinate system and a vehicle coordinate system, and a conversion relationship between the vehicle coordinate system and a geodetic coordinate system;

S3: acquiring a real-time number n of the pepper plants in the to-be-harvested region in front of the pepper harvester and an average height L from canopies of the pepper plants to soil through the processed laser point cloud data;

S4: acquiring a real-time cutting width w and a pepper fruit proportion p of the to-be-harvested region in front of the pepper harvester through processed images;

S5: acquiring a comprehensive lowermost location of pepper fruits in the to-be-harvested region by combination of point clouds and images;

S6: measuring a real-time rotation speed N of a picking drum using a Hall sensor, symmetrically and fixedly mounting sensor probes on left and right ends of a drum shaft, fixing steel magnets on spring-tooth mounting plates on left and right sides, measuring a real-time operation speed $V_0$ of the harvester by a navigation speed measurement system, mounting the navigation speed measurement system on the cab top of the pepper harvester, and mounting drum height sensors on both sides of a drum supporting shaft for acquiring a real-time height of the drum, the drum height sensors being ultrasonic sensors;

S7: predicting a pepper plant density q through an improved BP neural network model, taking the number n of the pepper plants, the height H of a cutting table, the average height L from the canopies of the pepper plants to the soil, and the pepper fruit proportion p as inputs of an improved BP neural network and a total mass m under a fixed area as an output of the BP neural network, calculating the plant density q through a formula according to the total mass m, and further calculating a predicted value of a feeding quantity at a next time, the formula for calculating the plant density being:

$$q = \frac{m}{1000 \cdot s'}$$

where m is the total mass under a specified area predicted by the BP neural network, and s' is an actual area processed;

the formula for calculating the feeding quantity being:

$$Q = wvq,$$

where Q is the predicted value of the feeding quantity, w is the cutting width, v is the operation speed of the harvester, and q is the plant density;

S8: controlling the rotation speed of the drum and the operation speed of the pepper harvester according to the predicted value of the feeding quantity and controlling the height of the cutting table according to the comprehensive lowermost location of pepper fruits, based on fuzzy PID control.

According to steps S1 and S6, the lidar, the camera, and the navigation speed measurement system are a solid-state lidar, a drive-free USB high-definition camera, and a BD/GPS dual-system navigation speed measurement module. The navigation speed measurement system is a real-time speed acquisition method based on extended Kalman filtering so as to improve the measurement accuracy and noise suppression capability of speed measurement.

According to step S2, the synchronizing the point cloud data and the image data in both time and space includes: implementing the time synchronization using the multi-source sensor time synchronization method based on frequency self-matching and then implementing the space synchronization using the combined calibration method on the basis of the time synchronization. The vehicle coordinate system is to be defined during the calibration, and laser point cloud coordinates are obtained through image pixel coordinates and corresponding geodetic coordinates are obtained through the laser point cloud coordinates finally.

According to step S3, the acquiring a real-time number n of the pepper plants in the to-be-harvested region in front of the harvester and an average height/from canopies of the pepper plants in the to-be-harvested region to soil includes: acquiring the number n of the pepper plants in the to-be-harvested region and the average height L from the canopies of the pepper plants in to-be-harvested region to the soil by performing a Euclidean distance clustering segmentation algorithm and DBSCAN-based adaptive point cloud clustering on the collected point cloud data, respectively, for predicting the plant density q by the improved BP neural network model subsequently.

According to step S4, the acquiring a cutting width w of the pepper harvester includes: collecting and processing pictures of the pepper plants in front of the cutting table, marking the cutting table of the harvester in the pictures thereafter, performing spacing template matching once to mark a row of plants nearest to the cutting table, taking the length of the cutting table as a total cutting width to further determine the number of plants within the cutting table in front of the cutting table, obtaining a distance between two farthest plants at this moment, and then obtaining the cutting width w.

According to step S4, the acquiring a pepper fruit proportion p of the pepper plants in the to-be-harvested region includes: processing the images collected by the camera to obtain a binarized image of pepper fruits and a binarized image of the whole plant, and then acquiring the numbers of pixel points of the two binarized images by an iterator access, the ratio of the two numbers being the pepper fruit proportion p. The image processing includes the following steps:

S41: performing histogram equalization processing on a picture processed in S1 to further increase the contrast of the picture and the clarity of the image;

S42: filtering processing: removing image noise and better preserving image edges using bilateral filtering based on comprehensive consideration;

S43: image segmentation: performing image segmentation using an OTSU method;

S44: morphological processing: eliminating small particle noise in the image using erosion and dilation;

S45: obtaining the binarized image of the pepper fruits and the binarized image of the whole pepper plant, respectively.

According to step S5, the acquiring a comprehensive lowermost location of pepper fruits in the to-be-harvested region includes: after pixel points of the binarized image of the pepper plant are scanned and detected to obtain a pepper pixel coordinate set of the pepper fruits located at the lowermost layer in the pepper plant image, obtaining a corresponding lidar coordinate point set through a conversion relationship between image pixel coordinates and lidar coordinates, obtaining a corresponding geodetic coordinate point set through a conversion relationship between the lidar coordinates and geodetic coordinates, and finally calculating an average value of Z coordinate values of points in the geodetic coordinate set as the comprehensive lowermost location of the pepper fruits.

According to step S8, the controlling the operation speed includes: setting a reasonable feeding quantity range $\lambda_1 < Q < \lambda_2$ in advance according to the magnitude of a torque to be applied to the drum shaft, appropriately reducing the speed when the predicted value of the feeding quantity exceeds the reasonable feeding quantity of the machine, appropriately increasing the speed when the predicted value of the feeding quantity is lower than the reasonable feeding quantity of the machine, and reducing the failure rate of the machine while ensuring the operation efficiency of a combine harvester.

The formula for calculating a target operation speed is:

$$V = V_0 + \frac{Q_{rated} - Q}{2.5 \cdot q},$$

where V is the target operation speed, $V_0$ is a measured real-time operation speed of the harvester, $Q_{rated}$ is a rated feeding quantity of the harvester, Q is the predicted feeding quantity, and q is the plant density.

According to step S8, the controlling the rotation speed of the drum includes: setting a reasonable feeding quantity range $\lambda_1 < Q < \lambda_2$ in advance according to the magnitude of a torque to be applied to the drum shaft, not changing the speed of the drum when the predicted value is within the reasonable range, appropriately increasing the rotation speed of the drum when the predicted feeding quantity is lower than a threshold, and reducing the rotation speed of the drum conversely, the adjustment range of the rotation speed of the drum being consistent with the change range of the predicted feeding quantity.

According to S8, the controlling the height of the cutting table includes: presetting a reasonable adjustment range of the height of the cutting table according to the measured average height from the canopies of the pepper plants to the soil, and resizing the cutting table according to the comprehensive lowermost location of the pepper fruits.

BRIEF DESCRIPTION OF THE DRAWINGS

In order to more clearly illustrate examples of the present disclosure or technical solutions of the prior art, a brief description of the drawings required to be used in the description of the examples or the prior art is given below, the drawings described below are only some examples of the present disclosure, and other drawings obtained from these drawings remain within the scope of the present disclosure to those of ordinary skill in the art without inventive effort.

Figure 1:
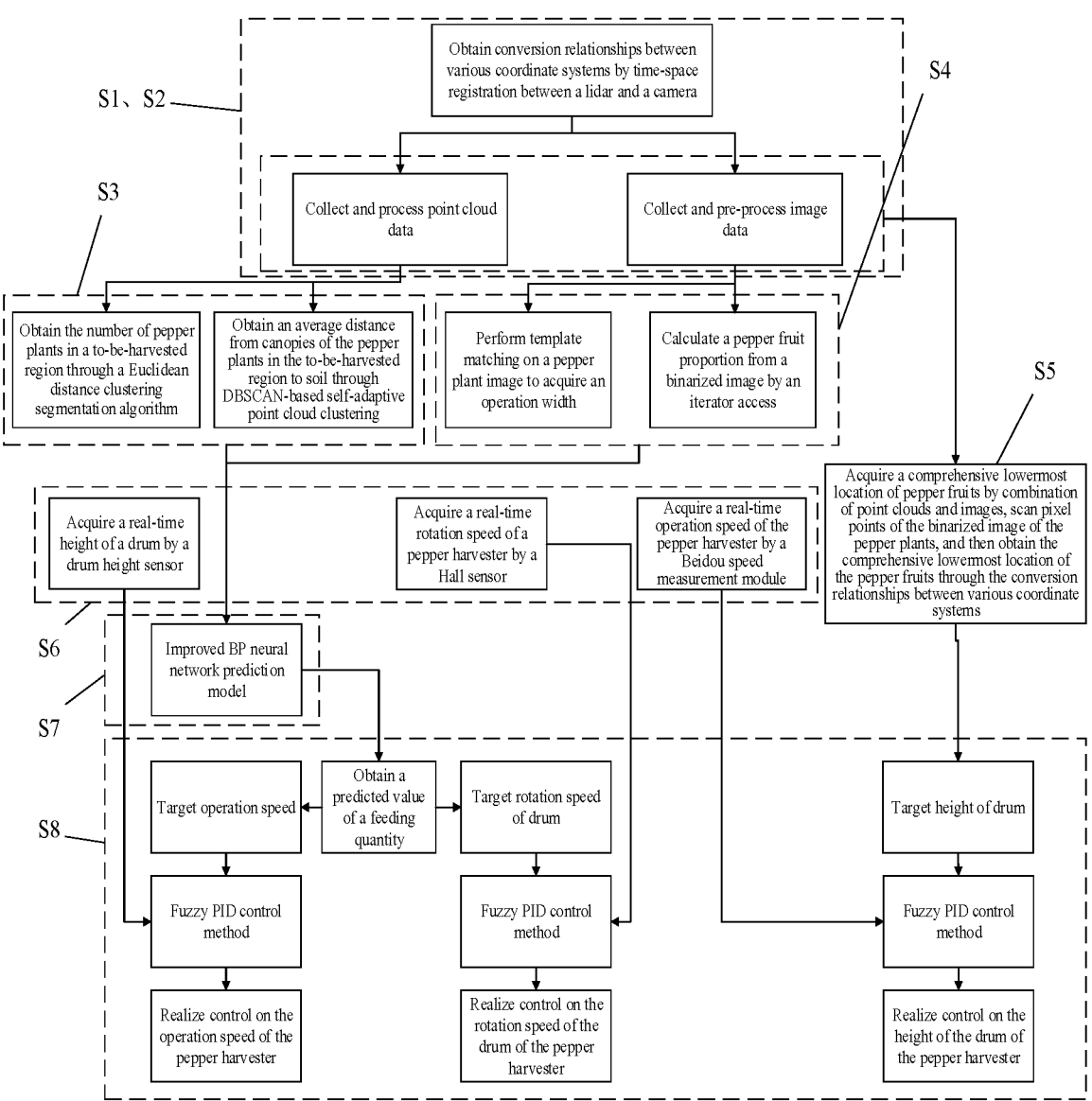
FIG. 1 is a schematic flowchart of at least one embodiment of the present disclosure.

In the figures: 1. camera; 2. solid-state lidar; 3. navigation speed measurement system; 4. drum height sensor (ultrasonic sensor); 5. Hall sensor.

DETAILED DESCRIPTION OF THE EMBODIMENTS

The technical solutions of the present disclosure are further described below but the scope of the claims is not limited thereto.

EXAMPLE 1

As shown in FIG. 1 to FIG. 9, a method for controlling motion parameters of a pepper harvester based on images and point clouds includes the following steps:

S1: Acquire laser point cloud data and image data of pepper plants in a to-be-harvested region from a lidar and a camera fixedly mounted on a cab top of a harvester.

S2: Implement time synchronization between the camera and the lidar using a multi-source sensor time synchronization method based on frequency self-matching and then implementing space synchronization using a combined calibration method on the basis of the time synchronization so as to synchronize the point cloud data and the image data in both time and space thereafter, perform pre-processing operations such as denoising and enhancing on the point cloud data and the image data collected by the camera, reduce the area of a non-operation region, reducing noise, increase the running speed of a system, perform coordinate system transformation on the point cloud data collected by the lidar so as to obtain the same region of interest (ROI) of the processed point cloud data and image data, and finally obtain a conversion relationship between an image pixel coordinate system and a lidar coordinate system, a conversion relationship between the lidar coordinate system and a vehicle coordinate system, and a conversion relationship between the vehicle coordinate system and a geodetic coordinate system.

S3: Acquire a real-time number n of the pepper plants in the to-be-harvested region in front of the pepper harvester and an average height L from canopies of the pepper plants to soil through the processed laser point cloud data.

S4: Acquire a real-time cutting width w and a pepper fruit proportion p of the to-be-harvested region in front of the pepper harvester through processed images.

S5: Acquire a comprehensive lowermost location of pepper fruits in the to-be-harvested region by combination of point clouds and images.

S6: Measure a real-time rotation speed N of a picking drum using a Hall sensor, symmetrically and fixedly mount sensor probes on left and right ends of a drum shaft, fix steel magnets on spring-tooth mounting plates on left and right sides, measure a real-time operation speed $V_0$ of the harvester by a navigation speed measurement system, mount the navigation speed measurement system on the cab top of the pepper harvester, and mount drum height sensors on both sides of a drum supporting shaft for acquiring a real-time height of the drum, the drum height sensors being ultrasonic sensors.

S7: Predict a pepper plant density q through a BP neural network model, take the number n of the pepper plants, the height H of a cutting table, the average height L from the canopies of the pepper plants to the soil, and the pepper fruit proportion p as inputs of an improved BP neural network and a total mass m under a fixed area as an output of the BP neural network, calculating the plant density q through a formula according to the total mass m, and further calculate a predicted value of a feeding quantity at a next time.

The formula for calculating the plant density is:

$$q = \frac{m}{1000 \cdot s'}$$

where m is the total mass under a specified area predicted by the BP neural network, and s' is an actual area processed.

The formula for calculating the feeding quantity is:

$$\backslash Q = wvq,$$

where Q is the predicted value of the feeding quantity, w is the cutting width, v is the operation speed of the harvester, and q is the plant density.

S8: Control the rotation speed of the drum and the operation speed of the pepper harvester according to the predicted value of the feeding quantity and control the height of the cutting table according to the comprehensive lowermost location of pepper fruits, based on fuzzy PID control.

EXAMPLE 2

First, space-time calibration of a lidar and a camera is performed, coordinate systems are defined and converted, and image and point cloud data are pre-processed.

Figure 4:
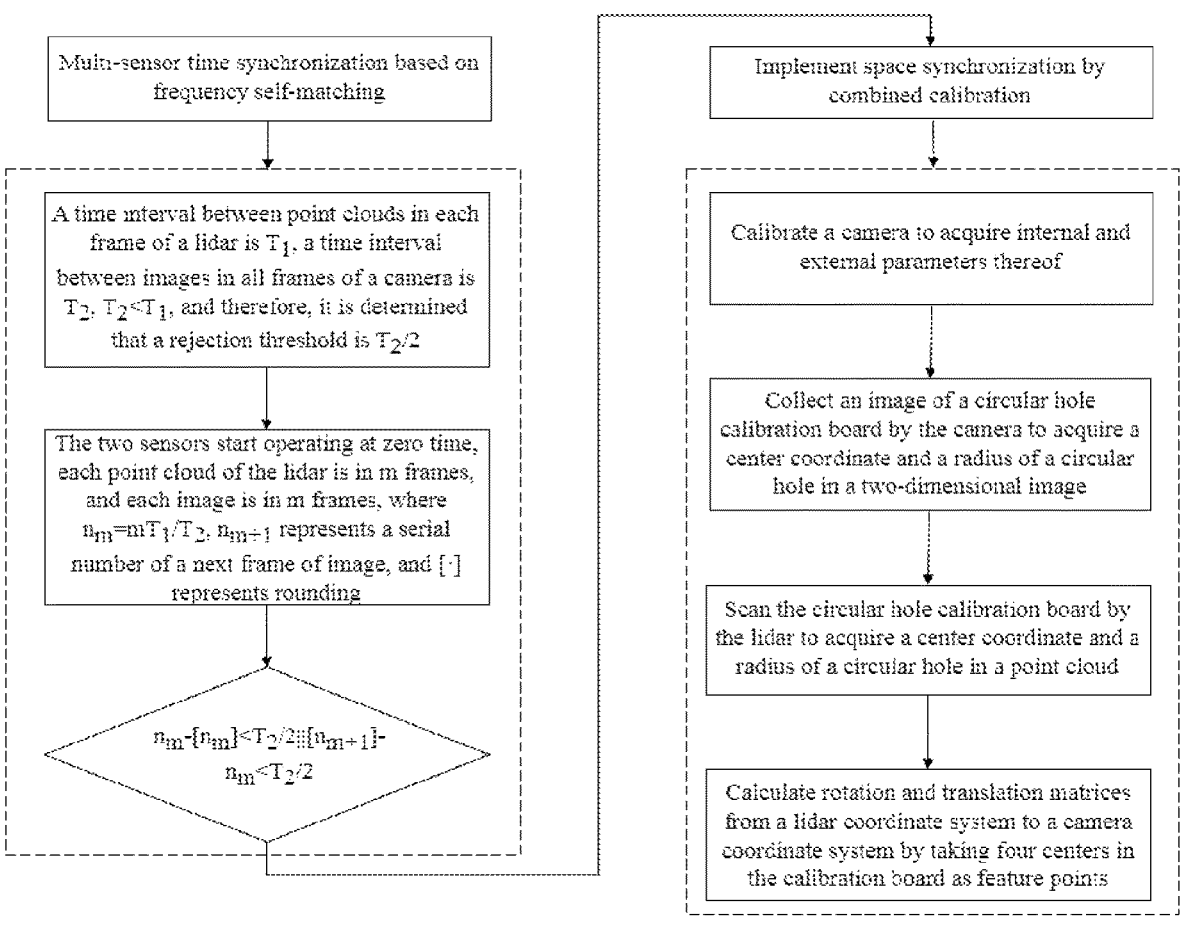
FIG. 4 is a flowchart of a space-time registration algorithm between a camera and a lidar according to the present disclosure.

As shown in FIG. 4, time synchronization between the camera and the lidar is implemented using a multi-source sensor time synchronization method based on frequency self-matching as follows.

It is assumed that an interval between point cloud data in all frames of the lidar is $T_1$ s and an interval between images in all frames of the camera is $T_2$ s. The data collection frequency of the lidar is less than the data collection frequency of the camera, that is, $T_2$ is less than $T_1$, and therefore, the threshold should be $T_2/2$. The two sensors are configured to start operating at zero time. After the same time, m frames are obtained for each point cloud of the lidar, and $n_m$ ($n_m = mT_1/T_2$) frames are obtained for each image of the camera. The next frame of images is numbered $$n_{m+1}\left(n_{m+1} = \left[\frac{mT_1}{T_2}\right] + 1 = \left[\frac{mT_1}{T_2} + 1\right]\right),$$

where all square brackets in this section indicate that they are integers.

When $$\frac{mT_1}{T_2} - \left[\frac{mT_1}{T_2}\right] < T_2/2,$$

m frames of point clouds and $n_m$ frames of images form a group of point pairs.

$$\frac{mT_1}{T_2} - \left[\frac{mT_1}{T_2}\right]$$

represents a difference between the time spent by $n_m$ frames of images and the corresponding m frames of lidar data. If the difference is less than a set threshold, this frame of image data may be retained, and otherwise will be rejected. When $$\left[\frac{mT_1}{T_2} + 1\right] - \frac{mT_1}{T_2} < T_2/2,$$

m frames of point clouds and $n_{m+1}+1$ frames of images form a group of point pairs.

$$\left[\frac{mT_1}{T_2} + 1\right] - \frac{mT_1}{T_2}$$

represents a difference between the time spent by $n_{m+1}+1$ frames of images and the corresponding m frames of lidar data. If the difference is less than a set threshold, this frame of image data may be retained, and otherwise will be rejected. The remaining image information which does not satisfy the above-mentioned two inequalities is eliminated. Finally, LiDAR and camera data are combined into a new data packet. The time synchronization of the information collected by the two sensors is implemented through the above-mentioned operation process.

On the basis of implementing the time synchronization between the camera and the lidar, the space synchronization between the camera and the lidar is implemented using combined calibration. The camera is calibrated using a checkerboard calibration board to obtain internal and external parameters of the camera. By setting a circular hole calibration board and taking the center of a circular hole in the calibration board as a feature point, the camera, the lidar, and a camera detect the location of the circular hole in the calibration board respectively, and a rotation matrix R and a translation matrix T between a lidar coordinate system and a camera coordinate system are calculated, so as to complete the combined calibration. A conversion relationship between the lidar coordinate system and an image pixel coordinate system is as follows:

$$Z_c \begin{bmatrix} u \\ v \\ 1 \end{bmatrix} = \begin{bmatrix} f_x & r & u_0 & 0 \\ 0 & f_y & v_0 & 0 \\ 0 & 0 & 1 & 0 \end{bmatrix} \begin{bmatrix} R & T \\ 0 & 1 \end{bmatrix} \begin{bmatrix} X_L \\ Y_L \\ Z_L \\ 1 \end{bmatrix},$$

where unknown quantities are the internal parameters, and the rotation matrix R and the translation matrix T between the lidar coordinate system and the camera coordinate system, $l=(X_L, Y_L, Z_L)$ is the lidar coordinate system, (U, V) is the image pixel coordinate system, $K=(f_x, f_y, u_0, v_0)$ is the internal parameter of the camera, and $Z_c$ is distance depth information.

The specific calibration process includes the following steps:

S1: Calibrate the camera first to acquire internal and external parameters thereof.

S2: Collect, by the camera, an image of the circular hole calibration board, and extract a center coordinate $c_i(u_i, v_i)$ (i=1, 2, 3, 4) and a radius $r_i$ (i=1, 2, 3, 4) of the circular hole in a two-dimensional image.

S3: Scan, by the lidar, the circular hole calibration board, and acquire a center coordinate $$C_i\left(x_i^L, y_i^L, z_i^L\right)$$

and a radius $R_i$ in a point cloud.

S4: Take four centers in the calibration board as feature points, establish a constraint relationship by converting the center coordinate $C_i$ of the lidar coordinate system to the center coordinate $c_i$ of the image coordinate system, and calculate the rotation and translation matrices from the lidar coordinate system to the camera coordinate system.

To realize the conversion between laser point cloud coordinates and vehicle coordinates, a vehicle coordinate system is defined as follows:

The vehicle coordinate system $O_bx_by_bz_b$ refers to a relative coordinate system fixed on a vehicle body. An origin coordinate of the vehicle coordinate system changes with the change of the location of the harvester. A horizontal zero plane passes through a front driving wheel shaft of the harvester and is parallel to the ground. A transverse zero plane passes through a midpoint of the front driving wheel shaft and is perpendicular to a horizontal plane. A longitudinal zero plane passes through the center of the whole track length and is perpendicular to the horizontal plane. Therefore, $O_b$ is an intersection point of the horizontal zero plane, the transverse zero plane, and the longitudinal zero plane of the harvester. Axis $x_b$ is an intersection line of the transverse zero plane and the horizontal zero plane, and the right side of the driver is positive. Axis $y_b$ is an intersection line of the longitudinal zero plane and the horizontal plane, and the forward side is positive. Axis $z_b$ is an intersection line of the transverse zero plane and the longitudinal zero plane, and the upward side is positive.

Since the lidar is mounted on the harvester body, the lidar point cloud coordinate system is required to be converted into the vehicle coordinate system of the pepper harvester. The conversion relationship may be composed of a translation matrix L and a rotation matrix F. The two coordinate systems are translated and rotated so that origins of the two coordinate systems coincide. Assuming $L=[L_x\ L_y\ L_z]$, F is obtained by Euler angle calculation. An intersection line between plane $O_Lx_Ly_Lz_L$ and plane $O_bx_by_bz_b$ is defined as $N_1N_2$, where $\varphi_1$ is an included angle between $O_Lx_L$ and $N_1N_2$, $\varphi_2$ is an included angle between $O_Lz_L$ and $O_bz_b$, and $\varphi_3$ is an included angle between $N_1N_2$ and $O_bx_b$. Therefore, the conversion relationship between the lidar point cloud coordinate and the vehicle coordinate of the pepper harvester is:

$$\begin{bmatrix} x_b \\ y_b \\ z_b \end{bmatrix} = F\begin{bmatrix} x_L \\ y_L \\ z_L \end{bmatrix} + \begin{bmatrix} L_x \\ L_y \\ L_z \end{bmatrix} = F(\varphi_1)\cdot F(\varphi_2)\cdot F(\varphi_3)\cdot\begin{bmatrix} x_L \\ y_L \\ z_L \end{bmatrix} + \begin{bmatrix} L_x \\ L_y \\ L_z \end{bmatrix}$$

where $$F(\varphi_1) = \begin{bmatrix} 1 & 0 & 0 \\ 0 & \cos\varphi_1 & \sin\varphi_1 \\ 0 & -\sin\varphi_1 & \cos\varphi_1 \end{bmatrix};$$

-continued $$F(\varphi_2) = \begin{bmatrix} \cos\varphi_2 & 0 & -\sin\varphi_2 \\ 0 & 1 & 0 \\ \sin\varphi_2 & 0 & \cos\varphi_2 \end{bmatrix};$$

$$F(\varphi_3) = \begin{bmatrix} \cos\varphi_3 & \sin\varphi_3 & 1 \\ -\sin\varphi_3 & \cos\varphi_3 & 0 \\ 0 & 0 & 1 \end{bmatrix}.$$

The vehicle coordinate system of the pepper harvester is fixed on the vehicle body, and when the pepper harvester runs, location information and an expected path relationship thereof are established in a geodetic coordinate system. Therefore, the conversion between the vehicle coordinate $O_bx_by_bz_b$ of the harvester and a geodetic coordinate Oxyz is required to be implemented through the following formula:

$$\begin{bmatrix} x \\ y \\ z \end{bmatrix} == F(\eta_1)\cdot F(\eta_2)\cdot F(\eta_3)\begin{bmatrix} x_b \\ y_b \\ z_b \end{bmatrix} + \begin{bmatrix} t_x \\ t_y \\ t_z \end{bmatrix},$$

where $\eta_1$, $\eta_2$, and $\eta_3$ are rotation angles of axes x, y, and z between two coordinate systems, and $t_x$, $t_y$, and $t_z$ are translation distances of each axis of the two coordinate systems.

Figure 2:
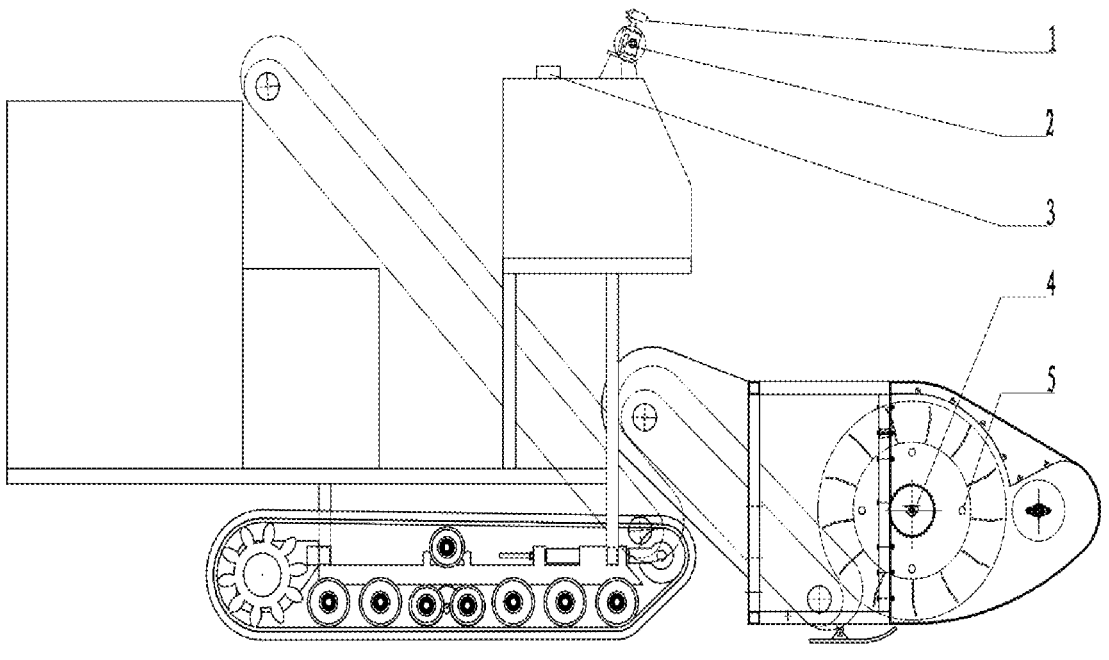
FIG. 2 is a schematic diagram of a mounting location of a sensor according to the present disclosure.

As shown in FIG. 2, the solid-state lidar is fixedly mounted on the top of the harvester body, the camera is fixed above the lidar using a two-axis pan-tilt, and the centers of the camera and the lidar are roughly located in the same vertical line, so as to acquire image information and point cloud information in front of the pepper harvester.

EXAMPLE 3

Figure 5:
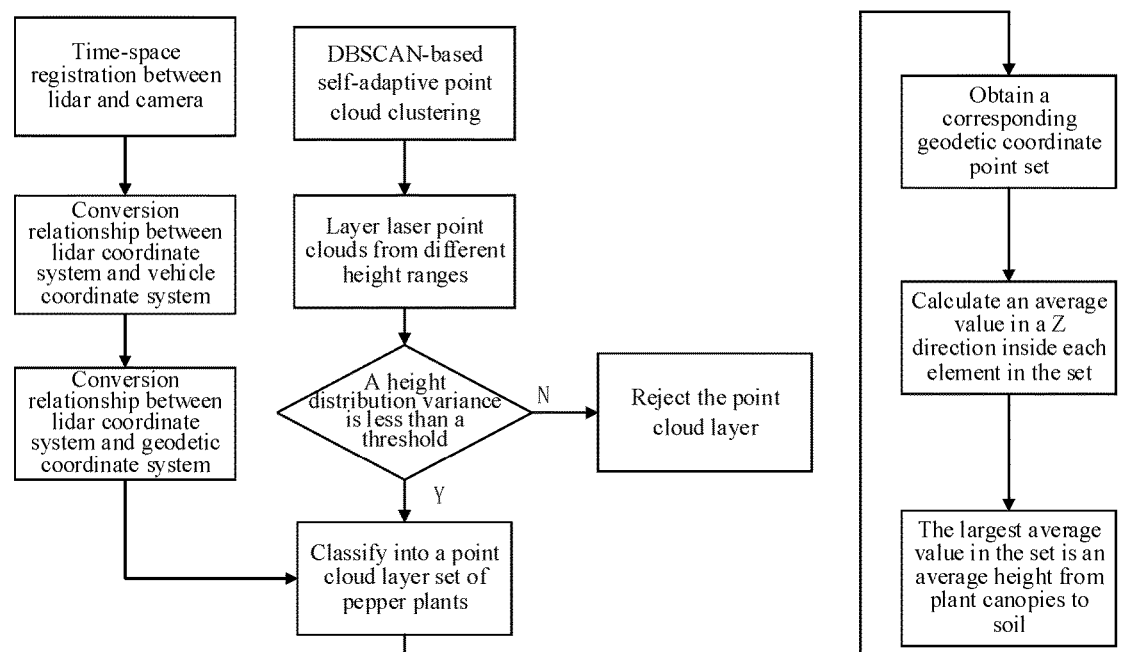
FIG. 5 is a flowchart of an algorithm for acquiring an average height from canopies of pepper plants to soil based on point clouds according to the present disclosure.

The method for acquiring parameters of pepper plants based on combination of point clouds and images includes:

S1: Method for acquiring average height from canopies of pepper plants to soil based on point clouds As shown in FIG. 5, a three-dimensional lidar coordinate of a point cloud obtained based on Example 2 may be converted into a geodetic coordinate through a conversion relationship. DBSCAN-based self-adaptive point cloud clustering is performed in a Z-axis direction of a geodetic coordinate system, namely, a normal direction perpendicular to the ground. Laser point clouds from different height ranges are layered. The validity of cluster data within a plant height range is determined by determining whether a height distribution variance of the cluster is less than a set threshold. If yes, it is indicated that the cluster has good planarity and the data comes from the point clouds of pepper plants. If no, the data is rejected.

Finally, the height is determined based on the largest average height in valid point cloud cluster categories of pepper plants as a final pepper plant population height. The formula is:

$$L = H_{geodetic} - \frac{1}{\varphi_{size}}\sum_{k\in\varphi} P_k^g\cdot norm_z,$$

where $H_{geodetic}$ represents a vertical height from an origin of a world coordinate system to the ground; $\varphi$ represents a point cloud cluster with the largest average height in all cluster categories; $\varphi_{size}$ represents the number of point clouds in a cluster region;

$$P_k^g$$

represents a $k^{th}$ coordinate in a ground coordinate system; and $norm_z$ represents a unit vector in the Z-axis direction.

S2: Method for acquiring number of pepper plants based on point clouds

Figure 6:
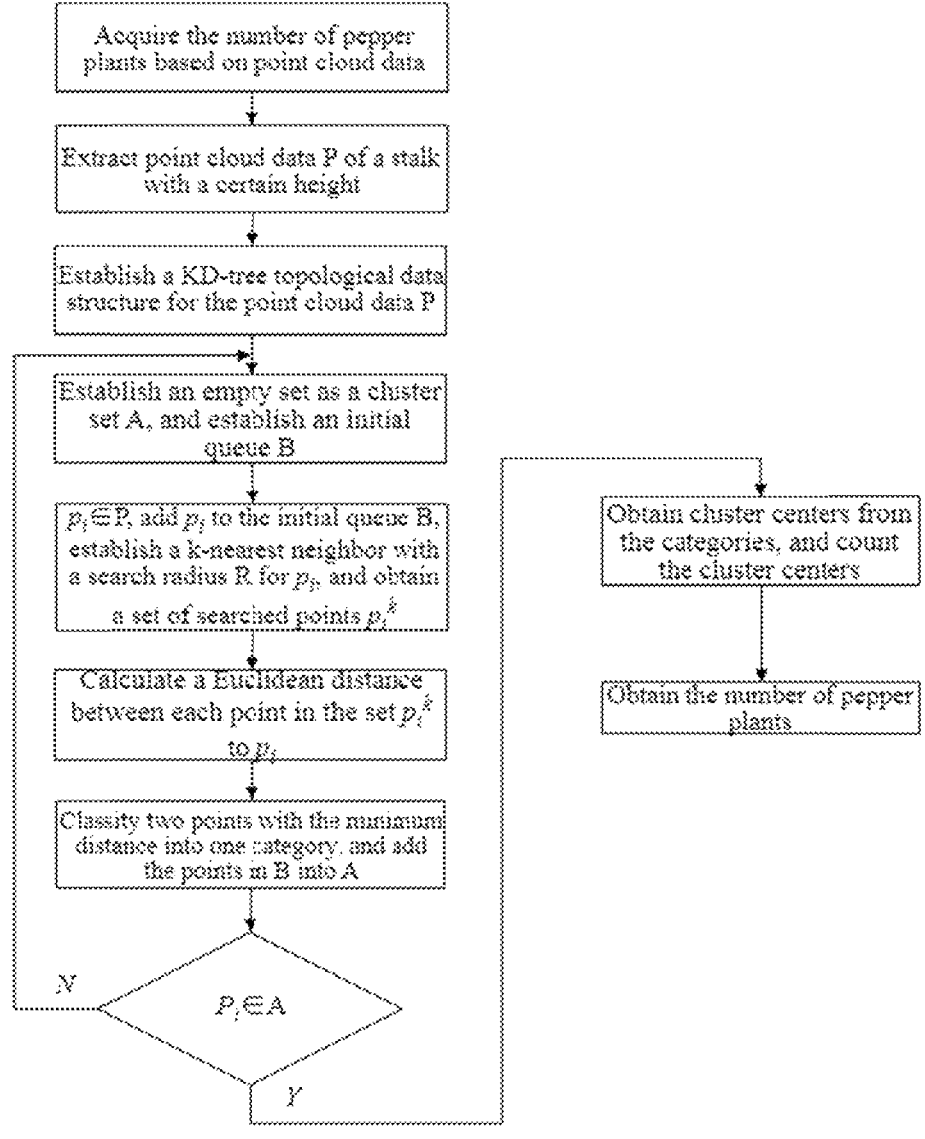
FIG. 6 is a flowchart of an algorithm for acquiring the number of pepper plants based on point clouds according to the present disclosure.

As shown in FIG. 6, based on Example 2, the number of pepper plants is acquired through the collected point clouds based on the following main idea: extracting stalks at a certain height, performing clustering segmentation on the extracted stalks of the crop population using a Euclidean distance clustering segmentation method to obtain cluster centers, and counting the cluster centers as the number of pepper plants. The core of the Euclidean distance clustering segmentation algorithm is to calculate a Euclidean distance of the point clouds, set a threshold that meets the requirements, and complete the segmentation of point cloud data. It is assumed that a point cloud space data set is G and a three-dimensional coordinate of the point cloud data is represented as (x,y,z), and the Euclidean distance between any two points in the point cloud data set G may be obtained by the following formula:

$$dist(i, j) = \sqrt{(x_i - x_j)^2 + (y_i - y_j)^2(z_i - z_j)^2}.$$

The specific flow of the Euclidean distance clustering segmentation algorithm includes the following steps:

S21: Establish a KD-tree topological data structure for point cloud data P.

S22: Establish an empty set A as a cluster set, and establish an initial queue B.

S23: Perform the following operation on each point $p_i (p_i \in P)$ in the point cloud data: adding $p_i$ to the initial queue B, and perform the following operations on all points $p_i (p_i \in P)$: establishing a k-nearest neighbor with a search radius R for $p_i (p_i \in P)$, obtaining a set of searched points $$p_i^k,$$

calculating a Euclidean distance between $$p_i^j$$

and $p_i$ for each point $$p_i^j (j \le i)$$

in the set $$p_i^k,$$

classifying two points with the minimum distance into one category, determining whether the above-mentioned operations are to be performed on all the points $p_i$, and adding the points in B into the set A.

S24: End the algorithm if $p_i$ is part of the set A when performing the above-mentioned operations on all the points $p_i$.

S3: Algorithm for acquiring pepper fruit proportion based on images

Figure 7:
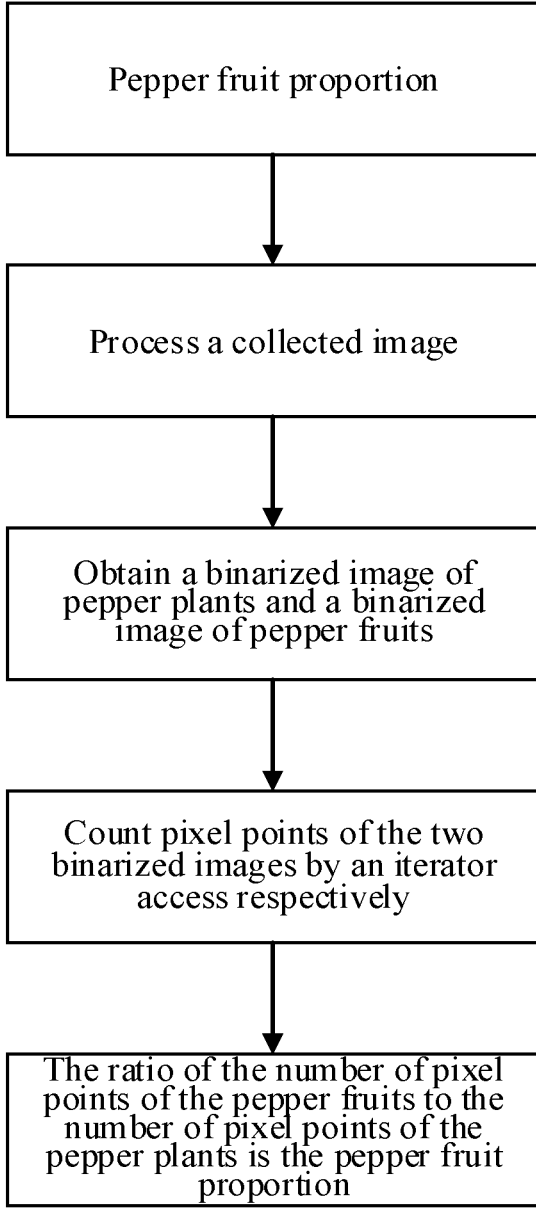
FIG. 7 is a flowchart of an algorithm for acquiring a pepper fruit proportion based on images according to the present disclosure.

As shown in FIG. 7, based on Example 2, the pepper fruit proportion is obtained by processing the images collected by the camera to obtain a binarized image of pepper fruits and a binarized image of the whole plant, and then acquiring the numbers of pixel points of the two binarized images by an iterator access, the ratio of the two numbers being the pepper fruit proportion.

The image processing includes the following steps:

S31: Perform histogram equalization processing on a pre-processed picture to further increase the contrast of the picture and the clarity of the image.

S32: Perform filtering processing: removing image noise and better preserving image edges using bilateral filtering based on comprehensive consideration.

S33: Perform image segmentation: performing image segmentation using an OTSU method.

S34: Perform morphological processing: eliminating small particle noise in the image using erosion and dilation.

S35: Obtain the binarized image of the pepper fruits and the binarized image of the whole pepper plant, respectively.

S4: Comprehensive lowermost location of pepper fruits

Figure 8:
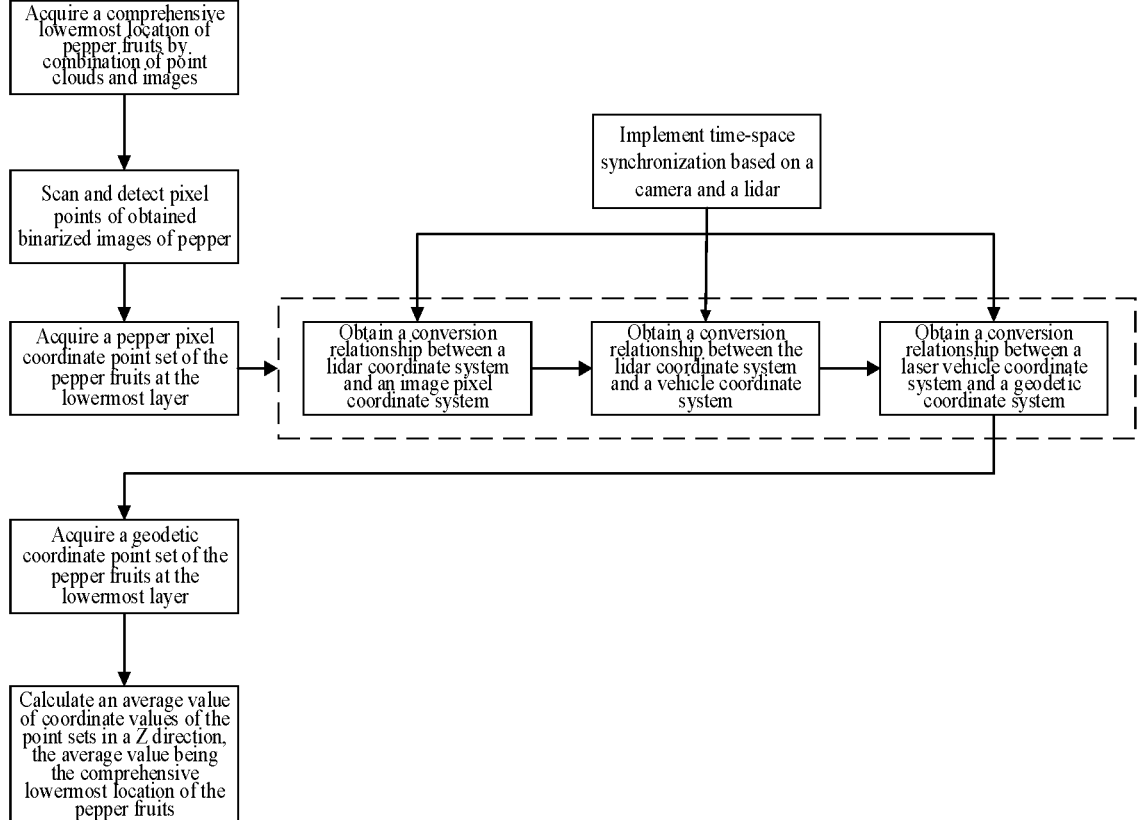
FIG. 8 is a flowchart of an algorithm for acquiring a comprehensive lowermost location of pepper fruits based on combination of images and point clouds according to the present disclosure.

As shown in FIG. 8, based on Example 2, the lidar and the camera are calibrated in combination, and a vehicle coordinate system and a geodetic coordinate system are defined to obtain a conversion relationship between a lidar point cloud coordinate system and an image pixel coordinate system:

$$Z_c \begin{bmatrix} u \\ v \\ 1 \end{bmatrix} = \begin{bmatrix} f_x & r & u_0 & 0 \\ 0 & f_y & v_0 & 0 \\ 0 & 0 & 1 & 0 \end{bmatrix} \begin{bmatrix} R & T \\ 0 & 1 \end{bmatrix} \begin{bmatrix} X_L \\ Y_L \\ Z_L \\ 1 \end{bmatrix}.$$

On the basis of obtaining the conversion relationship between the lidar point cloud coordinate and the image coordinate system, a comprehensive lowermost location of pepper is acquired by combination of laser point clouds and images according to the following steps:

S41: Scan and detect pixel points based on the binarized image obtained previously, so as to obtain pepper pixel coordinates of pepper fruits located at the lowermost layer in a pepper plant image according to the following specific processes:

S411: Perform edge detection using a canny operator on the basis of obtaining the binarized image of the processed image of the pepper plants, to obtain an edge image of the pepper fruits.

S412: Perform point-by-point traversal on the whole image, determine whether a pixel value of each point searched is 255, if yes, record a pixel coordinate of the point, otherwise, search for a next point, and store the recorded points stored in an array.

S413: Classify the pixel coordinates in the array according to whether the abscissas are the same or not after the whole image is traversed, compare ordinates of the pixel coordinates with the same abscissas, and retain pixel coordinate points with the smallest ordinate in each category, the obtained pixel coordinate points being the pixel coordinates of the pepper fruits located at the lowermost layer.

S42: Further obtain lidar coordinates of the pepper fruits located at the lowermost layer obtained previously through the conversion relationship between the lidar and image pixel coordinates.

S43: Map the obtained pixel coordinate set to the corresponding lidar coordinates, convert the lidar coordinates into vehicle coordinates through a formula and finally into geodetic coordinates through a formula, add values finally obtained in a z direction of a point set of coordinate points in the geodetic coordinate system, and take an average value, the average value being a minimum comprehensive height of the pepper fruits.

EXAMPLE 4

The method for acquiring real-time motion parameters of a pepper harvester includes the following steps:

S1: Acquire a rotation speed by a Hall sensor.

The Hall sensor mainly includes a sensor probe and a steel magnet. The sensor is respectively fixed on a spring-tooth mounting plate on the left and right sides. An N pole of the steel magnet is uniformly coated with AB glue to the spring-tooth mounting plate.

Based on accuracy requirements, four steel magnets are glued in a circle. The Hall sensor probe generates a pulse signal every time it passes through a steel magnet. Every time four pulse signals are acquired, a component rotates once. Finally, the pulse signals are transmitted to a main controller through a signal output end for counting and displaying.

S2: Acquire a real-time operation speed by a navigation speed measurement system based on the following sub-steps:

S21: Correctly reset the system after power-on.

S22: Acquire an initial operation speed of the system.

Relevant information such as the operation time, longitude and latitude, and speed of the machine may be obtained by the navigation speed measurement system. If a location at time $t-\Delta t$ and time $t+\Delta t$ is $S_{m-1}-S_{m+1}$, the operation speed at time t is:

$$V_m = \frac{s_{m+1} - s_{m-1}}{2 \cdot \Delta t},$$

where $\Delta t$ is a sampling time(s), and $V_m$ is the magnitude of speed (m/s).

S23: Improve the accuracy and noise suppression of speed measurement using an extended Kalman filter algorithm.

The formula for establishing a discrete nonlinear speed measurement model is:

$$\begin{cases} X_{m+1} = f(X_m, U_m) + Z \\ Y_{m+1} = f(X_m, U_m) + z' \end{cases}$$

where fO and gO represent transfer functions of a nonlinear system, and Z and z represent system noise and measurement noise. The system noise is generated by inaccurate system parameters of the harvester, and the measurement noise is generated by a basic error of the sensor. O and D are taken as a variance matrix of the system. $X_m$ is a state variable of the system, $Y_m$ is an output value, and $U_m$ is a control variable, which is 0 here.

A section of Taylor expansion is performed on the nonlinear functions based on $X_m$ according to the following formula:

$$\begin{cases} A = \dfrac{\partial f}{\partial X} \bigg|_{X = \hat{X}_m^+} \\ C = \dfrac{\partial g}{\partial X} \bigg|_{X = \hat{X}_m^+} \end{cases},$$

where $$\hat{X}_m^+$$

is a state estimation value of the speed measurement system at a next sampling time. If a longitudinal acceleration and a longitudinal acceleration change rate of the harvester are $\alpha_m$ and $i_m$, the formulas for $\alpha_m$ and a motion state component $X_m$ of the longitudinal acceleration are:

$$a_m = \frac{1}{\Delta t}(V_m - ),$$

$$X_m = [V_{m-1}, a_m, i_m].$$

If the distances traveled by the harvester at t, $t+\Delta t$, and $t+2\Delta t$ are $S_m$, $S_{m+1}$, and $S_{m+2}$, respectively, the following formula is obtained:

$$\begin{cases} S_{m+1} = S_m + V_m t + \dfrac{1}{2} \cdot a_m \cdot t^2 \\ S_{m+2} = S_{m+1} + V_{m+1} t + \dfrac{1}{2} \cdot a_{m+1} \cdot t^2 \end{cases}.$$

From the above formula, the speed $V_{m+2}$ at $t+\Delta t$ is:

$$V_{m+2} = V_{m+1} + a_{m+1} t + \frac{1}{2} \cdot i_{m+1} \cdot t^2.$$

From the above formula, an equation of state for the longitudinal speed is:

$$X_m = \begin{bmatrix} V_m & a_m \cdot t & \dfrac{1}{2} \cdot i_m \cdot t^2 \\ 0 & a_m & i_m \cdot t \\ 0 & 0 & i_m \end{bmatrix} + Z.$$

The equation is substituted into a formula (first-order Taylor expansion) to derive:

$$A = \begin{bmatrix} 1 & t & \dfrac{1}{2} \cdot t^2 \\ 0 & 1 & t \\ 0 & 0 & 1 \end{bmatrix}.$$

Z is the system noise of the harvester, the main influencing factor is a sampling period of the sensor, and a variance matrix D formula thereof is:

15

$$D = \begin{bmatrix} \dfrac{t^5}{20} & \dfrac{t^4}{8} & \dfrac{t^3}{6} \\[2mm] \dfrac{t^4}{8} & \dfrac{t^3}{6} & \dfrac{t^2}{2} \\[2mm] \dfrac{t^3}{6} & \dfrac{t^2}{2} & t \end{bmatrix} \times 0.03.$$

Similarly, C=[1, 1, 1], and the observation noise Z is mainly determined by the speed measurement module. Finally, the speed of the combine harvester is estimated through an update equation of the extended Kalman filter algorithm according to the following formula:

$$\begin{cases} P_{m|m-1} = AP_{m|m-1}A^T + D \\ P_{m|m} = X_{m|m-1} + K_{m|g} \cdot (Y_m - C \cdot X_{m|m-1}) \\ K_{m|g} = P_{m|m-1} \cdot C^T / (C \cdot P_{m|m-1} \cdot C^T + O) \\ P_{m|m} = [I - K_{m|g} \cdot C] \cdot P_{m|m-1} \end{cases},$$

where $P_{m|m-1}$ is a predicted value of an error covariance from time m−1 to time m, and $K_{m|g}$ is a Kalman gain. An optimal estimation value $X_{m|m}$ at time m estimated using a Kalman filter model may be obtained according to (the previous formula). That is, the real-time speed of the harvester may be obtained.

S3: Acquire the height of a drum in real time.

In the acquisition of the height of a cutting table, the height from a drum supporting shaft to the ground is acquired by two drum height devices (ultrasonic sensors) arranged on both sides of the drum supporting shaft, and then an actual height from the bottom of the drum to the ground is obtained through formulas. The height from the bottom of the drum to the ground is the height of the drum. The formulas are:

$$H_{height} = \frac{H_1 + H_2}{2},$$

$$H = H_{height} - H_{difference},$$

where H, $H_{height}$, $H_{difference}$, $H_1$, and $H_2$ represent the real-time height of a drum to be measured, the measured height of the drum height sensor, the height difference from the drum supporting shaft to the bottom of the drum, the height to the ground measured by the sensor on the left side of the drum supporting shaft, and the height to the ground measured by the sensor on the right side of the drum supporting shaft, respectively.

EXAMPLE 4

Figure 9:
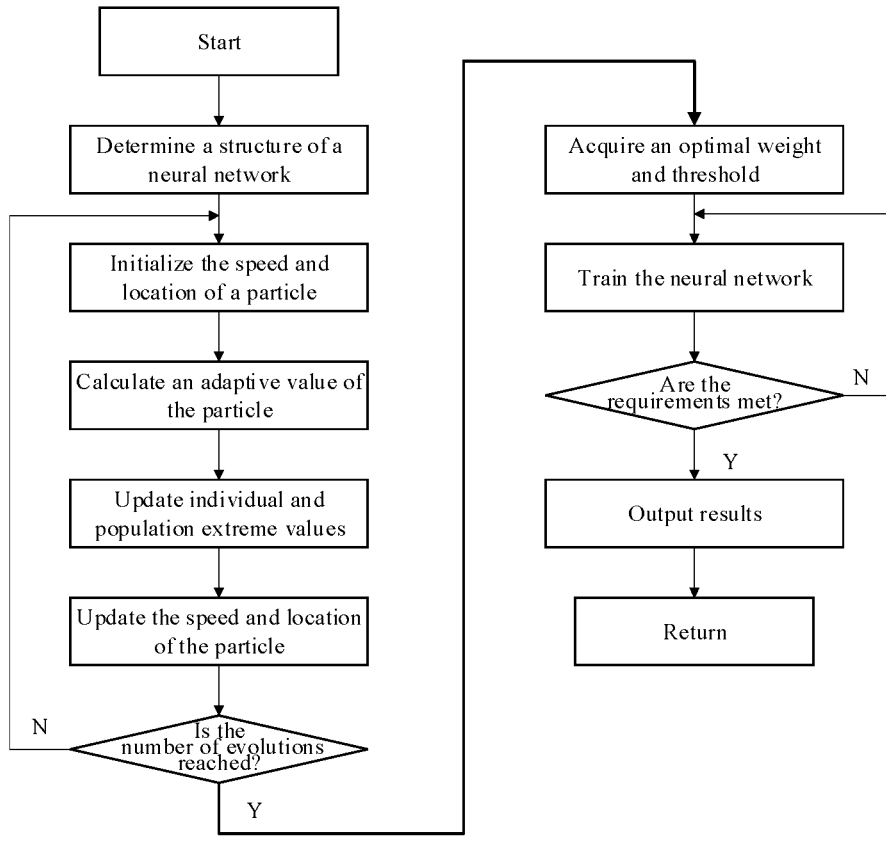
FIG. 9 is a flowchart of BP neural network processing according to the present disclosure.

FIG. 9 shows a process of using obtained pepper plant parameters for training an improved BP neural network model.

Since the traditional BP neural network model has the shortcomings of being slow in convergence and easy to fall into a local minimum state in the training, particle swarm optimization is proposed to improve the traditional BP neural network model, thus improving the global search ability of the model to improve the model prediction accuracy. The improved BP neural network model based on particle swarm optimization is described in detail as follows:

S1: Particle swarm optimization

16

The particle swarm optimization obtains an optimal adaptive value using the continuous update of the location and speed of particles. It is determined whether the particle swarm optimization reaches a maximum value. If yes, a global optimal extreme value and a corresponding global optimal adaptive value are outputted. If no, the training continues. Finally, the global optimal extreme value, namely, an optimal initial value and a threshold, are assigned to a neural network for training according to the following formulas:

$$v_{id}^{k+1} = wv_{id}^k + c_1 r_1 (p_{id}^k - X_{id}^k) + c_2 r_2 (p_{gd}^k - X_{id}^k),$$

$$X_{id}^{k+1} = v_{id}^{k+1} + X_{id}^k,$$

where w represents an inertia weight; d=1, 2, . . . , D; k is the number of iterations of the system; $v_{id}$ represents the speed of the particle, and $X_{id}$ represents the location of the particle; $c_1$ and $c_2$ are acceleration factors, typically non-negative constants; and $r_1$ and $r_2$ are random numbers in [0, 1].

S2: Improved BP neural network model

S21: In order to shorten the training time, referring to the existing theory, when the number of nodes in a hidden layer is enough, even if only one hidden layer can achieve any accuracy to approach the nonlinear function, a hidden layer is established first and provided with a three-layer BP neural network model with a small number of nodes, and then the number of nodes is continuously increased until meeting the expectation. If the requirements cannot be met, the training continues by adding hidden layers.

S22: Select, through the previous analysis, four nodes in an input layer (the number of pepper plants, the height of a cutting table, a pepper fruit proportion, and an average height from the canopies of the pepper plants to the soil) and one node in an output layer (a total mass under a fixed area), the total mass under a fixed area being the above-mentioned feeding density.

S23: Number of nodes in hidden layer

Too few nodes in the hidden layer will lead to insufficient accuracy and poor fitting effect, and too many nodes will lead to too long training time and low efficiency. However, there is no reliable theory to guide the selection of the number of nodes. Therefore, the following empirical formula will be usually used:

$$n = \sqrt{i + j} + a,$$

where n is the number of nodes in the hidden layer, i is the number of nodes in the input layer, j is the number of nodes in the output layer, and $\alpha$ is a constant, which is usually taken as 0-10. After multiple verifications, the number of selected nodes in the hidden layer is 8.

S24: Transfer function

A logsig function is selected for the hidden layer, and a purelin function is selected for the output layer. The formulas therefor are:

$$\log sig(x) = \frac{1}{1 + e^{-x}},$$

17

-continued $$purelin(x) = x.$$

S25: Training and simulation of improved neural network model

S251: Structural determination of improved neural network model

The three-layer BP neural network model is adopted. The four parameters, namely the number of pepper plants, the height of the cutting table, the pepper fruit proportion, and the average height from the canopies of the pepper plants to the soil, are taken as the input layer, the total mass m under a fixed area is taken as the output layer, and the number of nodes in the hidden layer is 8.

S252: Data collection and pre-processing

A total of 300 groups of data are collected in the field, where 70% of samples form a training set, 15% of the samples form a validation set, and the rest form a test set. In order to prevent the phenomenon of saturation, the collected data is normalized using a mapminmax function.

S253: Sample training and accuracy evaluation of training model

After being normalized, the data is inputted into the model for training, the number of iterations is 1000, learning factors satisfy $c_1=c_2=2$, and the minimum error of a training target is 0.000001.

The accuracy of the model is judged using evaluation indexes: mean absolute error (MAE) and root mean square error (RMSE), in order to estimate the accuracy of the model. When the mean square error is small and the generalization ability of the training set is not improved, the accuracy of the model is the best.

S254: Simulation of model

The model is simulated using MATLAB, and as a model determination coefficient (goodness of fit) is closer to 1, the fitting effect is better. By analyzing the fitting effect of the data in the training set, the test set, and the validation set, the model determination coefficient of the whole data set is comprehensive compared. When the model determination coefficient is close to 1, a fitting model of a prediction model has a good prediction effect.

S255: Calculation of plant density

The total mass m under a fixed area predicted by the model is substituted into a pepper plant density calculation formula to obtain a real-time plant density q in front of the pepper harvester. The pepper plant density calculation formula is:

$$q = \frac{m}{1000 \cdot s'}.$$

S256: Calculation of feeding quantity at next time predicted by model

The predicted plant density q is substituted into a basic formula Q=wvq to obtain a feeding quantity of the harvester at a next time.

EXAMPLE 5

Figure 3:
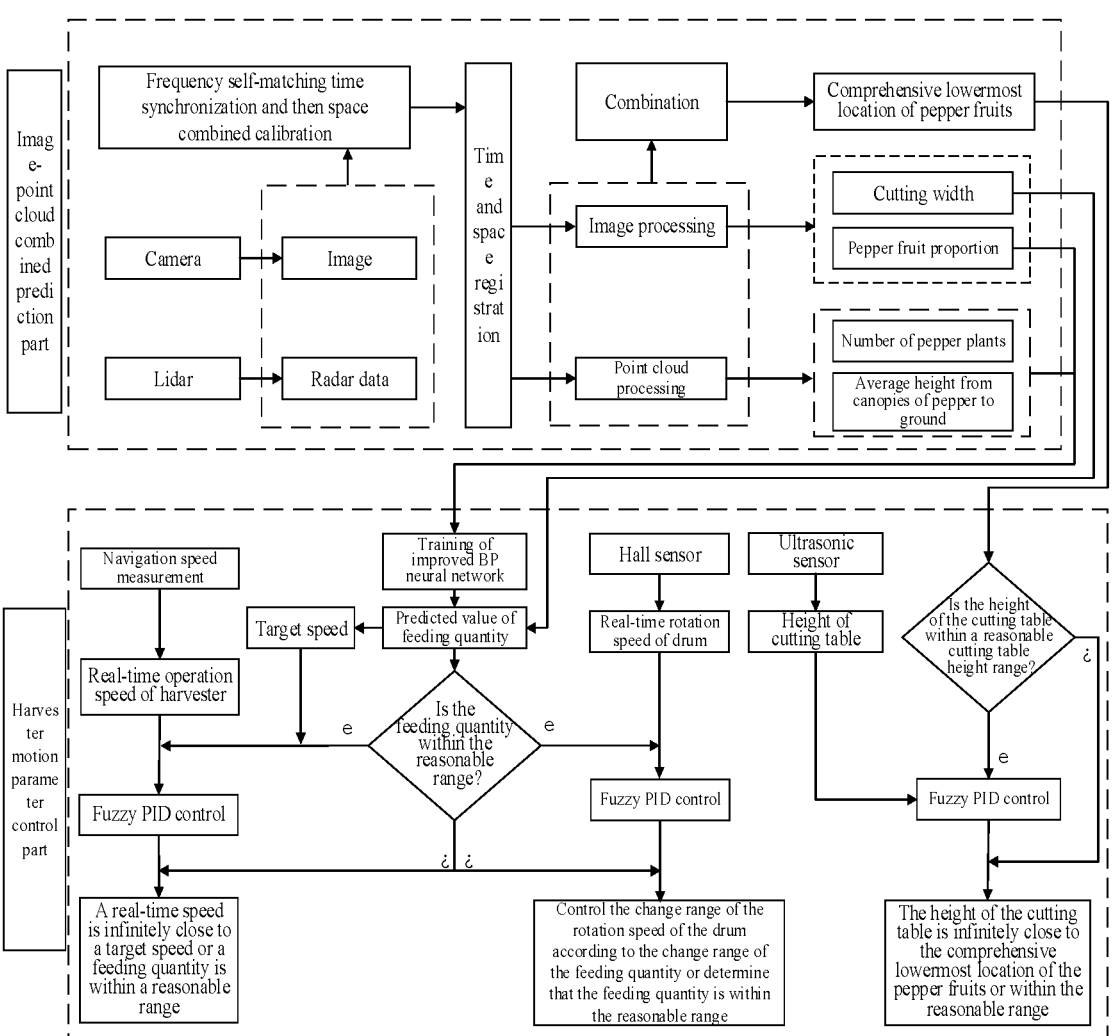
FIG. 3 is a flowchart of acquiring and controlling parameters of a pepper harvester based on combination of point clouds and images according to the present disclosure.

FIG. 1 and FIG. 3 show a method for controlling motion parameters of a pepper harvester in real time in combination with a predicted value of a feeding quantity and a comprehensive lowermost location of pepper fruits, specifically including the following steps:

S1: Control a harvesting operation speed using a fuzzy PID control method.

The operation speed of the pepper harvester is controlled using fuzzy PID control. In the control system, a fuzzy relationship between PID parameters and deviation e and deviation rate ec is mainly excavated and modified so as to achieve the best control effect. The specific steps are as follows:

S11: Determine inputs and outputs. The real-time operation speed of the harvester is obtained by the navigation speed measurement system. The predicted value of the total mass m under the fixed area may be obtained by the improved BP neural network model, and then the plant density may be obtained through the formula for the plant density q.

Finally, a target operation speed V is obtained through a target speed formula, and a deviation e and deviation rate ec of the operation speed are calculated. The deviation e and deviation rate ec of the operation speed are taken as input linguistic variables, and three parameters $K_p$, $K_i$, and $K_d$ of the fuzzy PID controller are taken as output linguistic variables.

The formula for calculating the plant density is:

$$q = \frac{m}{1000 \cdot s'}.$$

The formula for calculating the target operation speed is:

$$V = V_0 + \frac{Q_{rated} - Q}{2.5 \cdot q}.$$

S12: Fuzzify the input and output variables. The operation speed is normalized, the fuzzy domains of the deviation e and the deviation rate ec are quantized to {−3, −2, −1, 0, 1, 2, 3}, and a fuzzy set of language is set to seven levels, including {NB, NM, NS, ZO, PS, PM, PB}.

S13: Determine a membership function. A triangle membership function is selected as the membership function herein since the triangle membership function is simple in calculation, fast in response, and capable of improving the sensitivity of the system.

S14: Establish a fuzzy control rule table. Fuzzy control rules in a speed control system are summarized based on expert experience and converted into fuzzy language. The parameter self-tuning rules are as follows. When the deviation e of the system is large, the value of $K_p$ is generally increased, $K_i$ is zero, and $K_d$ is assigned with a small value. When the deviation e and the deviation rate ec are small, $K_p$ and $K_i$ are appropriately adjusted. When ec is large, $K_d$ is assigned with a small value. When ec is small, $K_d$ is assigned with a large value. Off-line edition is performed in MATLAB software according to the tuning rules, and the edited content is stored to a data module of a control unit.

S15: Perform reasoning and defuzzification. A Zadeh approximate reasoning method is used herein for completing the reasoning by the fuzzy control rules and obtaining a fuzzy control quantity. In addition, the defuzzification is also required. In order to operate quickly, a weighted average method is usually used. The formula is:

$$b_0 = \frac{\sum_{i=0}^{n} \mu_c(b_0) * b_i}{\sum_{i=0}^{n} \mu_c(b_i)},$$

where $b_0$ is an accurate output value, $b_i$ is a value in the universe of the fuzzy control quantity, and $\mu_c(b_i)$ is a membership value of $b_i$.

S16: Perform defuzzification. The control quantity is changed from a fuzzy quantity to an accurate quantity according to the following algorithm:

$$U(x) = K_p e(x) + K_p T \sum_{i=0}^{q} e(i) + K_p \frac{e(x) - e(x-1)}{T}, \tag{15}$$

where T is the sampling time of the system, $K_p$, $K_i$, and $K_d$ are proportion, integration, and differentiation adjustment coefficients of the fuzzy PID controller, which are linearly combined to form the output of the control quantity, so as to realize the control of the operation speed of the pepper harvester.

S2: Control the height of a drum of the pepper harvester using the fuzzy PID control method.

A reasonable drum height adjustment range $h_1 < H < h_2$ is set according to the height from the canopies of the pepper plants to the soil. Before the control, it is determined whether the comprehensive lowermost location of pepper fruits is within this range. If yes, an original drum height is kept unchanged. If no, the control is performed as follows:

The height of the drum of the pepper harvester is controlled using fuzzy PID control. In the control system, a fuzzy relationship between PID parameters and deviation e and deviation rate ec is mainly excavated and modified so as to achieve the best control effect. The specific steps are as follows:

S21: Determine inputs and outputs. A real-time height of the drum is obtained by an ultrasonic sensor arranged at the side of a drum supporting shaft. The comprehensive lowermost location of pepper fruits is obtained by combination of images and laser point clouds. A deviation e and deviation rate ec of the height of the drum are calculated. The deviation e and deviation rate ec of the height of the drum are taken as input linguistic variables, and three parameters $K_p$, $K_i$, and $K_d$ of the fuzzy PID controller are taken as output linguistic variables.

S22: Fuzzify the input and output variables. The operation speed is normalized, the fuzzy domains of the deviation e and the deviation rate ec are quantized to $\{-3, -2, -1, 0, 1, 2, 3\}$, and a fuzzy set of language is set to seven levels, including {NB, NM, NS, ZO, PS, PM, PB}.

S23: Determine a membership function. A triangle membership function is selected as the membership function herein since the triangle membership function is simple in calculation, fast in response, and capable of improving the sensitivity of the system.

S24: Establish a fuzzy control rule table. Fuzzy control rules in a speed control system are summarized based on expert experience and converted into fuzzy language. The parameter self-tuning rules are as follows. When the deviation e of the system is large, the value of $K_p$ is generally increased, $K_i$ is zero, and $K_d$ is assigned with a small value. When the deviation e and the deviation rate ec are small, $K_p$ and $K_i$ are appropriately adjusted. When ec is large, $K_d$ is assigned with a small value. When ec is small, $K_d$ is assigned with a large value. Off-line edition is performed in MATLAB software according to the tuning rules, and the edited content is stored to a data module of a control unit.

S25: Perform reasoning and defuzzification. A Zadeh approximate reasoning method is used herein for completing the reasoning by the fuzzy control rules and obtaining a fuzzy control quantity. In addition, the defuzzification is also required. In order to operate quickly, a weighted average method is usually used. The formula is:

$$b_0 = \frac{\sum_{i=0}^{n} \mu_c(b_0) * b_i}{\sum_{i=0}^{n} \mu_c(b_i)},$$

where $b_0$ is an accurate output value, $b_i$ is a value in the universe of the fuzzy control quantity, and $\mu_c(b_i)$ is a membership value of $b_i$.

S26: Perform defuzzification. The control quantity is changed from a fuzzy quantity to an accurate quantity according to the following algorithm:

$$U(x) = K_p e(x) + K_p T \sum_{i=0}^{q} e(i) + K_p \frac{e(x) - e(x-1)}{T},$$

where T is the sampling time of the system, $K_p$, $K_i$, and $K_d$ are proportion, integration, and differentiation adjustment coefficients of the fuzzy PID controller, which are linearly combined to form the output of the control quantity, so as to realize the control of the height of the drum of the pepper harvester.

S3: Control an operation speed of the drum of the pepper harvester using the fuzzy PID control method.

When the harvester starts to operate, a normal rotation speed of the drum is set. The magnitude of a feeding quantity at a next time is predicted according to the measured plant parameters and in combination with the BP neural network model. It is determined whether the predicted feeding quantity is within a set reasonable feeding quantity range. If yes, the magnitude of the rotation speed of the drum is not changed, otherwise, the change range of the rotation speed of the drum is correspondingly adjusted according to the change range of the predicted feeding quantity at the next time compared with the real-time feeding quantity. That is, when $Q < \lambda_1$, the rotation speed of the drum should be increased, and the rotation speed of the drum should be adjusted to $$\frac{NQ_{current}}{Q}.$$

When $Q > \lambda_2$, the rotation speed of the drum should be reduced, and the rotation speed of the drum should be adjusted to $$\frac{NQ_{current}}{Q}.$$

Here, $Q_{current}$ is the predicted current feeding quantity, and Q is the feeding quantity at the next time predicted by the model. The adjustment of the rotation speed is controlled using a fuzzy PID control method. The rotation speed of the drum of the pepper harvester is controlled using fuzzy PID control. In the control system, a fuzzy relationship between PID parameters and deviation e and deviation rate ec is mainly excavated and modified so as to achieve the best control effect. The specific steps are as follows:

S31: Determine inputs and outputs. A real-time rotation speed of the drum is obtained by a Hall sensor mounted on a spring-tooth supporting plate of a spring-tooth drum. A target adjustment rotation speed of the drum is calculated by the change of the feeding quantity. A deviation e and deviation rate ec of the rotation speed of the drum are calculated. The deviation e and deviation rate ec of the height of the cutting table and the rotation speed of the drum are taken as input linguistic variables, and three parameters $K_p$, $K_i$, and $K_d$ of the fuzzy PID controller are taken as output linguistic variables.

S32: Fuzzify the input and output variables. The operation speed is normalized, the fuzzy domains of the deviation e and the deviation rate ec are quantized to $\{-3, -2, -1, 0, 1, 2, 3\}$, and a fuzzy set of language is set to seven levels, including $\{NB, NM, NS, ZO, PS, PM, PB\}$.

S33: Determine a membership function. A triangle membership function is selected as the membership function herein since the triangle membership function is simple in calculation, fast in response, and capable of improving the sensitivity of the system.

S34: Establish a fuzzy control rule table. Fuzzy control rules in a speed control system are summarized based on expert experience and converted into fuzzy language. The parameter self-tuning rules are as follows. When the deviation e of the system is large, the value of $K_p$ is generally increased, $K_i$ is zero, and $K_d$ is assigned with a small value. When the deviation e and the deviation rate ec are small, $K_p$ and $K_i$ are appropriately adjusted. When ec is large, $K_d$ is assigned with a small value. When ec is small, $K_d$ is assigned with a large value. Off-line edition is performed in MATLAB software according to the tuning rules, and the edited content is stored to a data module of a control unit.

S35: Perform reasoning and defuzzification. A Zadeh approximate reasoning method is used herein for completing the reasoning by the fuzzy control rules and obtaining a fuzzy control quantity. In addition, the defuzzification is also required. In order to operate quickly, a weighted average method is usually used. The formula is:

$$b_0 = \frac{\sum_{i=0}^{n} \mu_c(b_0) * b_i}{\sum_{i=0}^{n} \mu_c(b_i)},$$

where $b_0$ is an accurate output value, $b_i$ is a value in the universe of the fuzzy control quantity, and $\mu_c(b_i)$ is a membership value of $b_i$.

S36: Perform defuzzification. The control quantity is changed from a fuzzy quantity to an accurate quantity according to the following algorithm:

$$U(x) = K_p e(x) + K_p T \sum_{i=0}^{q} e(i) + K_p \frac{e(x) - e(x-1)}{T},$$

where T is the sampling time of the system, $K_p$, $K_i$, and $K_d$ are proportion, integration, and differentiation adjustment coefficients of the fuzzy PID controller, which are linearly combined to form the output of the control quantity, so as to realize the control of the rotation speed of the drum of the pepper harvester.

What is claimed is:

1. A method for controlling motion parameters of a pepper harvester based on combination of point clouds and images, comprising:

acquiring laser point cloud data and image data of pepper plants in a to-be-harvested region from a lidar and a camera fixedly mounted on a cab top of a harvester;

implementing time synchronization between the camera and the lidar using a multi-source sensor time synchronization method based on frequency self-matching and then implementing space synchronization using a combined calibration method on a basis of the time synchronization so as to synchronize the laser point cloud data and the image data in both time and space thereafter, performing pre-processing operations comprising denoising and enhancing on the laser point cloud data and the image data collected by the camera, reducing an area of a non-operation region, reducing noise, increasing a running speed of a system, performing coordinate system transformation on the laser point cloud data collected by the lidar so as to obtain same region of interest (ROI) of processed laser point cloud data and processed image data, and finally obtaining a conversion relationship between an image pixel coordinate system and a lidar coordinate system, a conversion relationship between the lidar coordinate system and a vehicle coordinate system, and a conversion relationship between the vehicle coordinate system and a geodetic coordinate system;

acquiring a real-time number n of the pepper plants in the to-be-harvested region in front of the pepper harvester and an average height L from canopies of the pepper plants to soil through the processed laser point cloud data;

acquiring a real-time cutting width w and a pepper fruit proportion p of the to-be-harvested region in front of the pepper harvester through the processed image data;

acquiring a comprehensive lowermost location of pepper fruits in the to-be-harvested region by combination of the point clouds and images;

measuring a real-time rotation speed N of a picking drum using a Hall sensor, symmetrically and fixedly mounting sensor probes on left and right ends of a drum shaft, fixing steel magnets on spring-tooth mounting plates on left and right sides, measuring a real-time operation speed $V_0$ of the pepper harvester by a navigation speed measurement system, mounting the navigation speed measurement system on the cab top of the pepper harvester, and mounting drum height sensors on both sides of a drum supporting shaft for acquiring a real-time height of the drum, the drum height sensors being ultrasonic sensors;

predicting a pepper plant density q through an improved back propagation (BP) neural network model, taking the real-time number n of the pepper plants, a height H of a cutting table, the average height L from the canopies of the pepper plants to the soil, and the pepper fruit proportion p as inputs of an improved BP neural network and a total mass m under a fixed area as an output of the improved BP neural network, calculating the pepper plant density q through a formula according to the total mass m, and further calculating a predicted value of a feeding quantity at a next time, a formula for calculating the pepper plant density being:

$$q = \frac{m}{1000 \cdot s'}.$$

wherein m is the total mass under the fixed area predicted by the improved BP neural network, and $s'$ is an actual area processed;

a formula for calculating the feeding quantity being:

$$Q = wvq$$

wherein Q is the predicted value of the feeding quantity, w is the real-time cutting width, v is an operation speed of the pepper harvester, and q is the pepper plant density; and controlling a real-time rotation speed of the drum and the operation speed of the pepper harvester according to the predicted value of the feeding quantity and controlling the height of the cutting table according to the comprehensive lowermost location of the pepper fruits, based on fuzzy proportional-integral-derivative (PID) control.

2. The method for controlling motion parameters of a pepper harvester based on combination of point clouds and images according to claim 1, wherein the lidar, the camera, and the navigation speed measurement system are a solid-state lidar, a drive-free universal serial bus (USB) high-definition camera, and a Beidou Navigation Satellite System/Global Position System dual-system navigation speed measurement system, the navigation speed measurement system being a real-time speed acquisition method based on extended Kalman filtering so as to improve a measurement accuracy and noise suppression capability of speed measurement.

3. The method for controlling motion parameters of a pepper harvester based on combination of point clouds and images according to claim 1, wherein the implementing the time synchronization and the space synchronization between the lidar and the camera further comprises: implementing the time synchronization using the multi-source sensor time synchronization method based on the frequency self-matching and then implementing the space synchronization using the combined calibration method on the basis of the time synchronization, wherein the vehicle coordinate system is to be defined during calibration, and laser point cloud coordinates are obtained through image pixel coordinates and corresponding geodetic coordinates are obtained through the laser point cloud coordinates finally.

4. The method for controlling motion parameters of a pepper harvester based on combination of point clouds and images according to claim 1, wherein the acquiring of the real-time number n of the pepper plants in the to-be-harvested region in front of the pepper harvester and the average height L from the canopies of the pepper plants in the to-be-harvested region to the soil further comprises: acquiring the real-time number n of the pepper plants in the to-be-harvested region and the average height L from the canopies of the pepper plants in the to-be-harvested region to the soil by performing a Euclidean distance clustering segmentation algorithm and a Density-Based Spatial Clustering of Applications with Noise (DBSCAN)-based adaptive point cloud clustering on the processed laser point cloud data, respectively, for predicting the pepper plant density q by the improved BP neural network model subsequently.

5. The method for controlling motion parameters of a pepper harvester based on combination of point clouds and images according to claim 1, wherein the acquiring of the real-time cutting width w of the pepper harvester further comprises: collecting and processing pictures of the pepper plants in front of the cutting table, marking the cutting table of the pepper harvester in the pictures thereafter, performing spacing template matching once to mark a row of plants nearest to the cutting table, taking a length of the cutting table as a total cutting width to further determine a number of plants within the cutting table in front of the cutting table, obtaining a distance between two farthest plants at this moment, and then obtaining the real-time cutting width w.

6. The method for controlling motion parameters of a pepper harvester based on combination of point clouds and images according to claim 1, wherein the acquiring of the pepper fruit proportion p of the pepper plants in the to-be-harvested region further comprises: processing the images collected by the camera to obtain a binarized image of the pepper fruits and a binarized image of a whole pepper plant, and then acquiring a number of pixel points of the binarized image of the pepper fruits and a number of pixel points of the binarized image of the whole pepper plant by an iterator access, a ratio of the number of pixel points of the binarized image of the pepper fruits to the number of pixel points of the binarized image of the whole pepper plant being the pepper fruit proportion p, the image processing comprising the following steps:

performing histogram equalization processing again on a pre-processed picture to further increase a contrast of the picture and a clarity of the image;

filtering processing: removing image noise and better preserving image edges using bilateral filtering based on comprehensive consideration;

image segmentation: performing image segmentation using an Otsu's Method;

morphological processing: eliminating small particle noise in the image using erosion and dilation; and obtaining the binarized image of the pepper fruits and the binarized image of the whole pepper plant, respectively.

7. The method for controlling motion parameters of a pepper harvester based on combination of point clouds and images according to claim 1, wherein the acquiring of the comprehensive lowermost location of the pepper fruits in the to-be-harvested region further comprises: after the pixel points of the binarized image of the whole pepper plant are scanned and detected to obtain a pepper pixel coordinate set of the pepper fruits located at a lowermost layer in a pepper plant image, obtaining a corresponding lidar coordinate point set through a conversion relationship between image pixel coordinates and lidar coordinates, obtaining a corresponding geodetic coordinate point set through a conversion relationship between the lidar coordinates and geodetic coordinates, and finally calculating an average value of Z coordinate values of points in a geodetic coordinate set as the comprehensive lowermost location of the pepper fruits.

8. The method for controlling motion parameters of a pepper harvester based on combination of point clouds and images according to claim 1, wherein the controlling of the operation speed further comprises: setting a reasonable feeding quantity range $\lambda_1 < Q < \lambda_2$ in advance according to a magnitude of a torque to be applied to the drum shaft, appropriately reducing the operation speed when the predicted value of the feeding quantity exceeds the reasonable feeding quantity of the pepper harvester, appropriately increasing the operation speed when the predicted value of the feeding quantity is lower than the reasonable feeding quantity of the pepper harvester, and reducing a failure rate of the pepper harvester while ensuring an operation efficiency of the pepper harvester, a formula for calculating a target operation speed being:

$$V = V_0 + \frac{Q_{rated} - Q}{2.5 \cdot q}$$

wherein V is the target operation speed, $V_0$ is the real-time operation speed of the pepper harvester, $Q_{rated}$ is a rated feeding quantity of the pepper harvester, Q is the predicted feeding quantity, and q is the pepper plant density.

9. The method for controlling motion parameters of a pepper harvester based on combination of point clouds and images according to claim 1, wherein the controlling the real-time rotation speed of the drum comprises: setting a reasonable feeding quantity range $\lambda_1 < Q < \lambda_2$ in advance according to a magnitude of a torque to be applied to the drum shaft, not changing the real-time rotation speed of the drum when the predicted value is within the reasonable feeding quantity range, appropriately increasing the real-time rotation speed of the drum when the predicted feeding quantity is lower than a threshold, and reducing the real-time rotation speed of the drum conversely, an adjustment range of the real-time rotation speed of the drum being consistent with a change range of the predicted feeding quantity.

10. The method for controlling motion parameters of a pepper harvester based on combination of point clouds and images according to claim 1, wherein the controlling the height of the cutting table comprises: presetting a reasonable adjustment range of the height of the cutting table according to a measured average height from the canopies of the pepper plants to the soil, and resizing the cutting table according to the comprehensive lowermost location of the pepper fruits.

* * * * *